(12) United States Patent
Fauri

(10) Patent No.: US 11,370,323 B2
(45) Date of Patent: Jun. 28, 2022

(54) AIRCRAFT WITH ENERGY BATTERY FOR CRUISE AND POWER BATTERY FOR TAKE-OFF AND LANDING

(71) Applicant: Dr. Ing. h.c. F. Porsche Aktiengesellschaft, Stuttgart (DE)

(72) Inventor: Mikel Fauri, Ludwigsburg (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 284 days.

(21) Appl. No.: 16/502,315

(22) Filed: Jul. 3, 2019

(65) Prior Publication Data

US 2020/0062139 A1   Feb. 27, 2020

(30) Foreign Application Priority Data

Jul. 4, 2018 (DE) .......................... 102018116167.0

(51) Int. Cl.
| | | |
|---|---|---|
| *B60L 58/18* | (2019.01) | |
| *B60L 50/60* | (2019.01) | |
| *B60L 53/53* | (2019.01) | |
| *B64C 3/56* | (2006.01) | |
| *B64C 11/00* | (2006.01) | |

(Continued)

(52) U.S. Cl.
CPC ............... *B60L 58/18* (2019.02); *B60L 50/66* (2019.02); *B60L 53/53* (2019.02); *B64C 3/56* (2013.01); *B64C 11/001* (2013.01); *B64C 27/32* (2013.01); *B64C 29/0025* (2013.01); *B64D 27/24* (2013.01); *B64D 41/00* (2013.01); *B60L 2200/10* (2013.01)

(58) Field of Classification Search
CPC .......... B60L 50/66; B60L 53/53; B60L 58/18; B64L 2200/10; B64C 3/56; B64C 11/001; B64C 27/32; B64C 29/0025; B64D 27/24; B64D 41/00
USPC ......................................................... 244/7 A
See application file for complete search history.

(56) References Cited

U.S. PATENT DOCUMENTS

| 2,712,421 A | 7/1955 | Naumann |
| 4,828,203 A | 5/1989 | Clifton et al. |
| | (Continued) | |

FOREIGN PATENT DOCUMENTS

| CN | 106981914 A | 7/2017 |
| CN | 107600390 A | 1/2018 |
| | (Continued) | |

OTHER PUBLICATIONS

Great Britain Combined Search and Examination Report for GB Application No. 1909478.8 dated Dec. 5, 2019, 5 pages.

(Continued)

*Primary Examiner* — Brady W Frazier
(74) *Attorney, Agent, or Firm* — RatnerPrestia

(57) ABSTRACT

An aircraft has an energy battery, a power battery, lifting rotors and cruise propellers and is configured such that the energy battery supplies the cruise propellers in cruising phases and the power battery supplies the lifting rotors in take-off and landing phases. The aircraft also includes a reserve power battery. The reserve power battery is configured to selectively supply power to the lifting rotors in an emergency. The reserve power battery is rechargeable, and, during the cruising phases, the energy battery is configured to charge the power battery and the reserve power battery.

10 Claims, 6 Drawing Sheets

(51) Int. Cl.
  *B64C 27/32* (2006.01)
  *B64C 29/00* (2006.01)
  *B64D 27/24* (2006.01)
  *B64D 41/00* (2006.01)

(56) References Cited

U.S. PATENT DOCUMENTS

| | | | |
|---|---|---|---|
| 9,376,208 B1* | 6/2016 | Gentry | G08G 5/006 |
| 10,131,426 B2 | 11/2018 | Judas et al. | |
| 2013/0206921 A1 | 8/2013 | Paduano et al. | |
| 2014/0097290 A1* | 4/2014 | Leng | B64C 11/46 244/6 |
| 2014/0158816 A1 | 6/2014 | DeLorean | |
| 2016/0039300 A1* | 2/2016 | Wang | B64D 35/02 244/39 |
| 2016/0107758 A1* | 4/2016 | Esteyne | B64D 27/24 318/139 |
| 2016/0200436 A1 | 7/2016 | North et al. | |
| 2016/0221683 A1 | 8/2016 | Roberts et al. | |
| 2017/0073065 A1* | 3/2017 | Von Novak | B64C 39/024 |
| 2017/0225573 A1* | 8/2017 | Waltner | B64D 27/24 |
| 2017/0305548 A1* | 10/2017 | Ozaki | B64D 27/04 |
| 2018/0201384 A1* | 7/2018 | Barth | B64D 27/24 |
| 2018/0327091 A1* | 11/2018 | Burks | B64C 39/10 |
| 2018/0339781 A1 | 11/2018 | Vander Lind et al. | |
| 2018/0364695 A1 | 12/2018 | Ponnarasseri et al. | |
| 2019/0241274 A1* | 8/2019 | Hunkel | B64D 35/08 |
| 2019/0291860 A1* | 9/2019 | Morgan | B64C 27/20 |
| 2019/0326764 A1 | 10/2019 | Gu et al. | |
| 2020/0009986 A1* | 1/2020 | Thrun | B60L 58/12 |

FOREIGN PATENT DOCUMENTS

| | | |
|---|---|---|
| DE | 4118594 C1 | 8/1992 |
| EP | 2592686 B1 | 10/2015 |
| GB | 2468787 A | 9/2010 |
| WO | 2015157114 A1 | 10/2015 |
| WO | 2016189797 A1 | 12/2016 |
| WO | 2018078388 A1 | 5/2018 |
| WO | 2018217218 A1 | 11/2018 |

OTHER PUBLICATIONS

Great Britain Combined Search and Examination Report for GB Application No. 1909483.8, dated Dec. 5, 2019, 6 pages.
Non Final Office Action for U.S. Appl. No. 16/502,320, dated Aug. 3, 2020, 21 pages.

* cited by examiner

AIRCRAFT WITH ENERGY BATTERY FOR CRUISE AND POWER BATTERY FOR TAKE-OFF AND LANDING

CROSS-REFERENCE TO RELATED APPLICATION

This application claims priority to German Patent Application No. 10 2018 116 167.0, filed Jul. 4, 2018, the content of such application being incorporated by reference herein in its entirety.

FIELD OF THE INVENTION

The present invention relates to an aircraft, in particular a fully electric vertical take-off and landing (VTOL) aircraft.

BACKGROUND OF THE INVENTION

VTOL is the cross-language name given in the aerospace industry to any type of aircraft, drone or rocket that has the capability of lifting off and landing substantially vertically and without a runway. This collective term is used below in a broad sense that includes not just fixed-wing aircraft with wings, but rather also rotary-wing aircraft such as helicopters, gyrocopters, gyrodynes and hybrids such as composite or combination helicopters and convertiplanes. Short take-off and landing (STOL) aircraft, short take-off and vertical landing (STOVL) aircraft and vertical take-off and horizontal landing (VTHL) aircraft are also included.

The current requirement during the take-off and landing phase of a VTOL is high. The battery of an electrically driven VTOL according to the prior art therefore has to meet extremely high requirements not only in terms of its capacity but also in terms of its power density.

CN106981914A, which is incorporated by reference herein, discloses a vehicle-assisted energy control method and system based on two batteries. In this case, the vehicle switches between a normal mode, a recovery mode, a reserve battery charging mode or an isolation mode depending on the vehicle state, wherein the vehicle load is supplied with current by a first battery in the normal mode, the vehicle load, the first battery and a second battery are simultaneously charged by a current generator in the recovery mode, the second battery is charged by the power generator in the reserve battery charging mode and the power is fed to the vehicle load by the first battery and to a starter motor by the second battery in the isolation mode. The batteries are thus intended to be efficiently charged and discharged over the entire operating cycle in accordance with various power requirements under different operating conditions.

EP2592 68681, which is incorporated by reference herein, describes a control system for controlling the operation of a storage battery, coupled to an energy grid, having a plurality of storage batteries arranged in an energy grid and a control device that defines an individual charge or discharge rate for the respective storage batteries using a requirement prediction on the basis of battery state and energy supply.

DE4118594C1, which is incorporated by reference herein, proposes, for an electric vehicle, the combination of a high-power battery having a relatively high specific energy content, for example a nickel/cadmium or sodium/sulfur or zinc/bromine battery, as a large energy storage element with a smaller battery of the same voltage having a smaller specific energy content, but relatively high power in relation to its weight and a considerably lower price/performance ratio, for example a lead gel or lead acid battery.

SUMMARY OF THE INVENTION

To solve the problem outlined above, an alternative form of energy supply is proposed that does not considerably increase the overall weight of the aircraft. To this end, the aircraft, is a fully electric vertical take-off and landing aircraft.

The aircraft may thus have for instance a reserve power battery that selectively supplies the lifting rotors in an emergency. In this way, even when an individual battery fails, at least one power battery is always available for landing.

The aircraft may furthermore be equipped with bent or even selectively bendable wings. A corresponding variant increases the effective wing surface in horizontal flight, without however increasing the footprint of the aircraft.

The aircraft may furthermore have a fast-charging battery system that provides the drive energy for vertical take-off and landing and horizontal flight and allows quick charging of the aircraft when stationary.

In this case, instead of free-moving rotors, a plurality of ducted fans, including of different sizes, may be used to drive the aircraft, as are known outside of the aerospace industry, for instance for hovercraft or fanboats. The cylindrical housing surrounding the fan may considerably reduce thrust losses caused by vortexes at the blade tips in such an embodiment. Suitable ducted fans may be aligned horizontally or vertically, designed so as to pivot between both positions or be covered by louvers during horizontal flight for aerodynamic reasons. Pure horizontal thrust generation using fixed ducted fans is additionally conceivable.

Details of the wings may be disclosed in U.S. Pat. No. 2,712,421, and further details of the propellers and rotors may be disclosed in U.S. patent Ser. No. 10/131,426, each of which is incorporated by reference herein in its entirety.

Finally, in addition to preferably fully autonomous operation of the aircraft, it is also possible to consider granting manual control to human pilots if they are sufficiently qualified, which gives the device according to aspects of the invention the greatest possible flexibility in terms of handling.

BRIEF DESCRIPTION OF THE DRAWING

One exemplary embodiment of the invention is illustrated in the drawings and will be described in more detail below.

DETAILED DESCRIPTION OF THE INVENTION

The terms 'fan,' 'rotor' and 'propeller' may be used interchangeably herein.

Figure 1A:
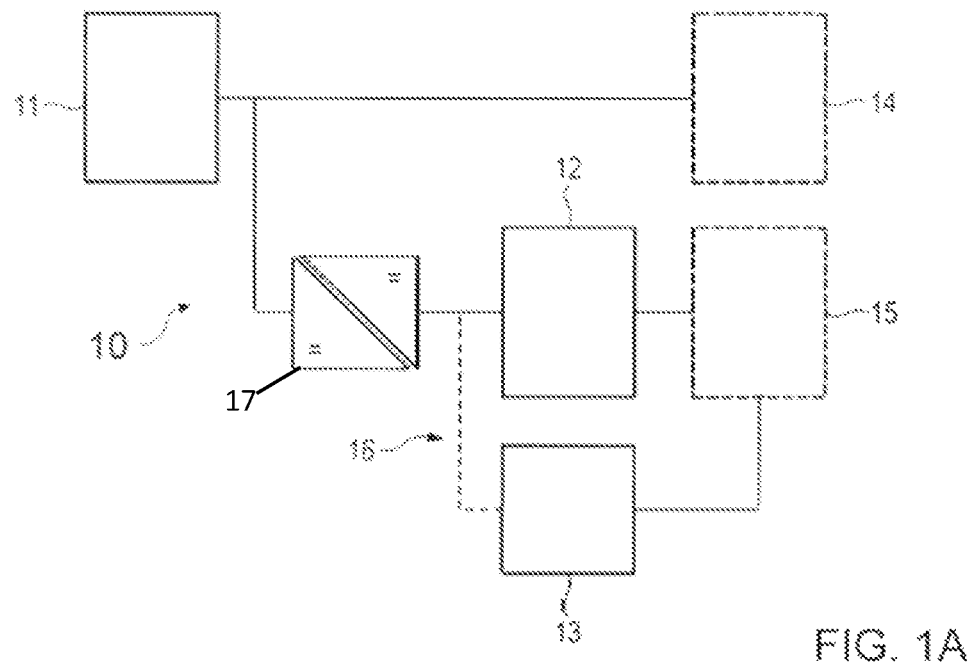
FIG. 1A shows the block diagram of an aircraft according to aspects of the invention.

FIG. 1A illustrates the structural features of one preferred embodiment of the aircraft 10 according to aspects of the invention, the flight phase-dependent operational principle of which is now explained with reference to FIGS. 1C to 1D.

Figure 1B:
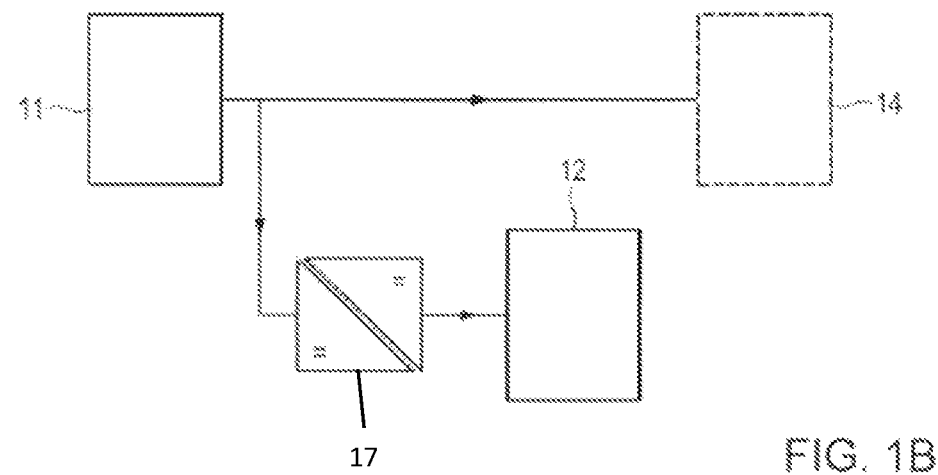
FIG. 1B shows the flow of energy during a cruising phase with comparatively low power consumption but high energy consumption.

As may be seen in FIG. 1B, an energy battery 11 supplies the cruise propellers 14 and is used only during the illustrated cruising phase. Its capacity is in this case designed for cruising and landing, while the maximum power draw depends on the power of the cruise propellers 14 and the recharge rate of an additional power battery 12.

Figure 1C:
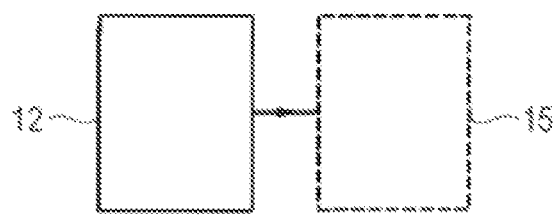
FIG. 1C shows the flow of energy during take-off and landing phases with a high to very high power requirement but just a low to middling energy requirement.

Said power battery 12, as illustrated in FIG. 1C, supplies only the lifting rotors 15 and is used continuously. The power battery 12 is discharged during take-off and landing and is recharged during cruising. Its capacity is dimensioned for the most unfavorable case of application of lift-off, since landing requires only a fraction of the take-off energy. The same applies to the design of the power battery 12 in terms of its power output and the power requirement at take-off and landing.

Figure 1D:
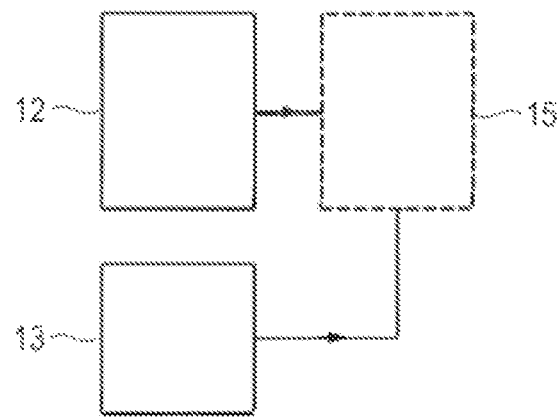
FIG. 1D shows the use of a reserve energy source in the event of a fault.

A reserve power battery 13 elucidated in FIG. 1D supplies only the lifting rotors 15 and is used solely for an emergency landing if the power battery 12 fails or if the landing has taken place earlier than expected and the cruising time was not long enough to recharge the power battery 12. Its capacity is accordingly based on the requirements of landing, and its maximum power output is based on the power consumption, required for hovering or landing, of the lifting rotors 15. It may be a primary or secondary cell.

A DC voltage converter 17 delivers a constant power in order to charge the power battery 12, which is generally discharged following take-off, during cruising, in order to be able to use said battery again during landing. As shown in FIG. 1A, the reserve power battery 13 and the power battery 12 are connected to one side of the DC voltage converter 17, and the energy battery 11 is connected to another side of the DC voltage converter 17.

Figure 2:
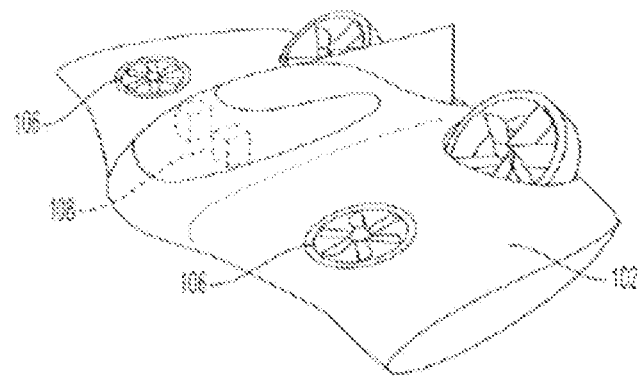
FIG. 2 depicts an isometric view of an aircraft, wherein the wings are shown in an extended configuration and the rear propellers are shown in an angled orientation.
Figure 3:
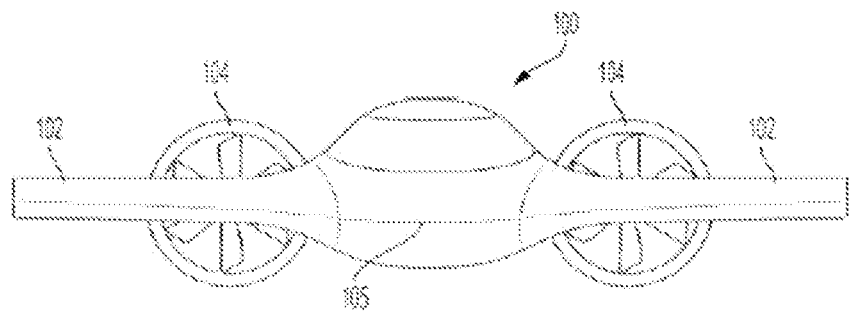
FIG. 3 depicts a front elevation view of the aircraft of FIG. 2, wherein the wings are shown extended configuration and the rear propellers are shown in a cruising orientation.
Figure 4:
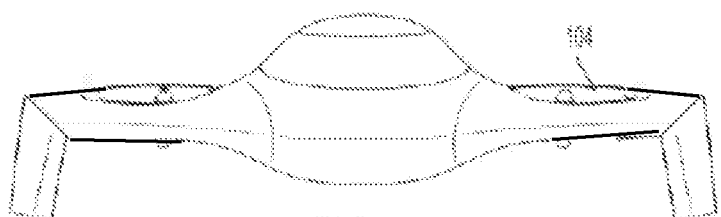
FIG. 4 depicts another front elevation view of the aircraft, wherein the wings are shown in a folded configuration and the rear propellers are shown in a take-off/landing orientation.

FIGS. 2-4 depict an aircraft 100. The aircraft 100 shown in those figures may appear different from the previously described aircraft, however, many (if not all) of the details of the previously described aircraft also apply to aircraft 100.

The aircraft 100 includes foldable wings 102. The wings 102 are shown in a folded configuration in FIG. 4 and an extended configuration in FIG. 3. A motor or solenoid is configured to move the wings between those configurations. Alternatively, the wings 102 may be permanently maintained in a folded (i.e., bent) position.

Rear propellers 104 are mounted on the trailing edge of the airfoils or wings 102 (i.e., the edge furthest from the nose 105). Propellers 104 may be referred to as cruising propellers because they are used during the cruising operation of the aircraft (at least in one position of the propellers 104). The propellers 104 are configured to pivot between two different positions, as shown in FIGS. 2-4. In the vertical position of the propellers 104 shown in FIG. 3, the propellers 104 generate maximum horizontal thrust for cruising operation of the aircraft (i.e., while the aircraft is flying through the air). In the horizontal position of the propellers 104 shown in FIG. 4, the propellers 104 generate maximum vertical thrust for take-off and landing operations of the aircraft. A motor or solenoid is configured to move the propellers 104 between those two positions. Alternatively, the propellers 104 may be immovable and fixed in a vertical position, as shown in FIG. 2.

Horizontally mounted propellers 106 are fixedly mounted and integrated into the wings 102. Unlike the propellers 104, the position of the propellers 106 is fixed, however, those skilled in the art will recognize that the propellers 106 could be modified so that they are pivotable between vertical and horizontal positions. The propellers 106 generate maximum vertical thrust for take-off and landing operations of the aircraft. The propellers 106 may also be referred to herein as lifting propellers.

The propellers 104 and 106, which may also be referred to herein as fans, may be operated by a fully-electric drive. To that end, a battery charging system 108 including a charger, an inverter and a fast-charging battery are positioned within the fuselage of the aircraft for powering the propellers 104 and 106. The fuselage may also be configured to carry one or more passengers.

Figure 5:
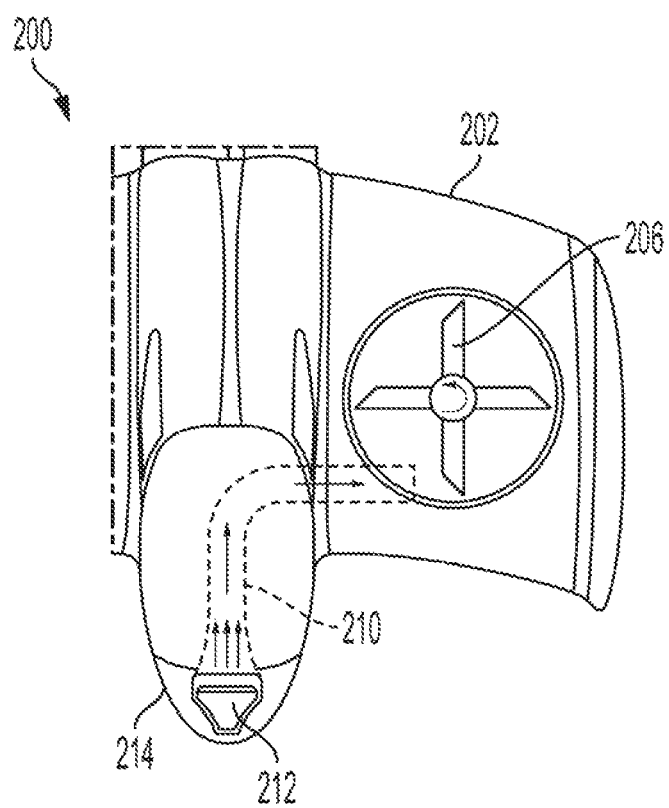
FIG. 5 depicts a top plan view of a portion of an aircraft, showing an internal duct extending between a nose of the aircraft and a horizontal fan mounted to the wing.
Figure 6:
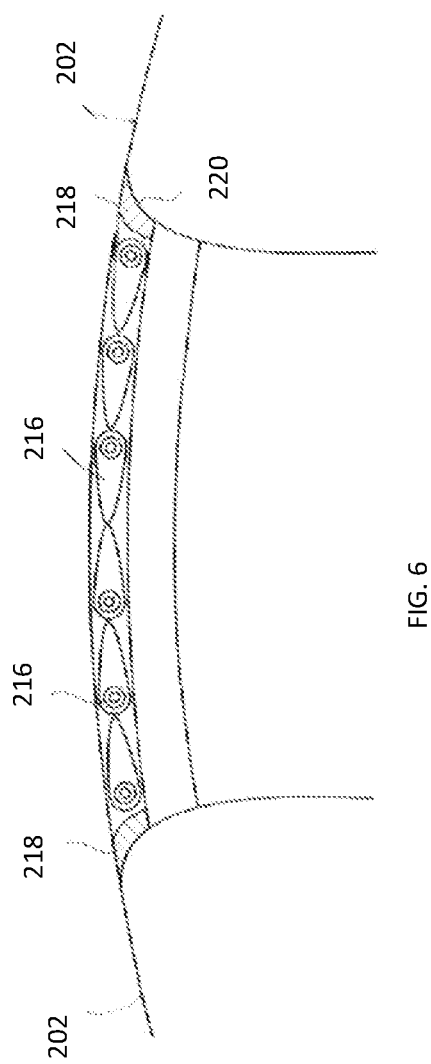
FIG. 6 depicts moveable louvers applied on top of the horizontal fan of FIG. 5, wherein the louvers are shown in a closed position.
Figure 7:
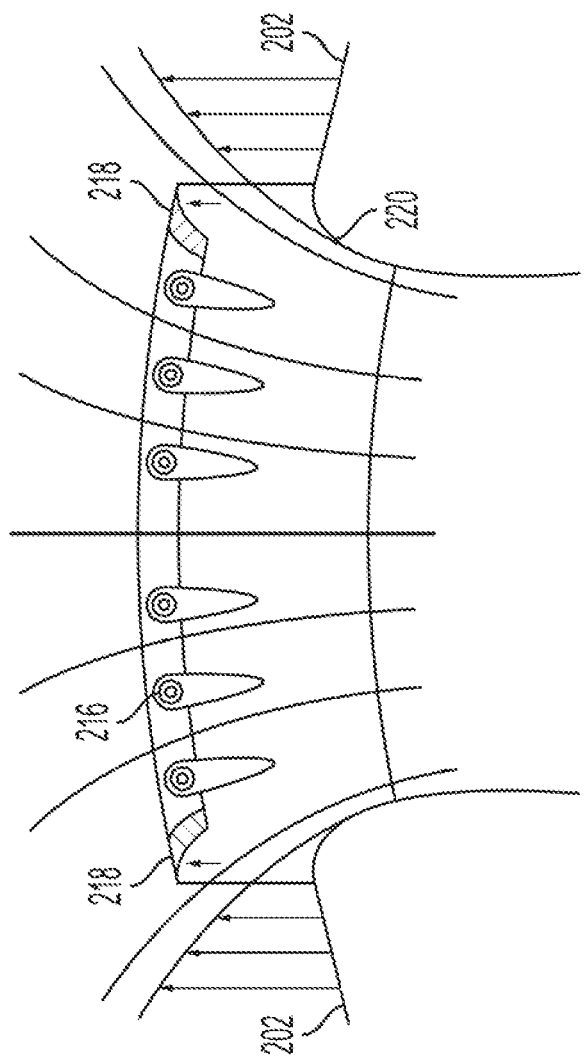
FIG. 7 depicts the movable louvers of FIG. 6, wherein the louvers are shown in an open position.

FIGS. 5-7 depict views of an aircraft 200. The aircraft 200 shown in those figures may appear different from the previously described aircraft 100, however, most (if not all) of the details of the previously described aircraft 100 also apply to aircraft 200. Only a segment of the aircraft 200 is shown in FIG. 5. An air duct 210 extends between an opening 212 formed on the nose 214 of the aircraft 200 and the horizontally mounted propeller 206 that is fixedly mounted to the wing 202. In operation, air is delivered to the propeller 206 via the duct 210, as depicts by the arrows. Although not shown, air ducts that are similar to duct 210, may extend to the propeller 206 on the opposite wing 202, as well as any rear propellers 104 (not shown in these views). Accordingly, the propellers may be referred to as either "ducted propellers" or "ducted fans."

FIGS. 6 and 7 depict louvers 216 that are configured to selectively cover the horizontally mounted propellers 206. It is noted that the louvers 216 are omitted from FIG. 5 for clarity purposes. Each louver 216 is rotatable about a shaft (or otherwise moveable) between a closed position (FIG. 6) and an open position (FIG. 7). The louvers 216, which are flush with the top face of the wing 202, may be moved to the closed position during the cruising operation of the aircraft 200 for aerodynamic purposes. The louvers 216 may be moved to an open position at any time during operation of the propellers 206 to permit the exit or entrance of air therethrough. A motor or solenoid is configured to move the louvers 216 between those positions. It is noted that the louvers are shown in a closed position in FIG. 2.

A sealing ring 218 surrounds the louvers 216 and is moveable between a retracted position (FIG. 6) and a deployed position (FIG. 7). The louvers 216 are mounted to the sealing ring 218 and move therewith between the retracted and deployed positions. The lower surface of the sealing ring 218 is configured to be in sealing relationship with an opening 220 formed in the wing 202. It should be understood that the opening 220 accommodates the body of the propeller 206. The sealing ring 218 may be moved to the retracted position, which is flush with the top face of the wing 202, during cruising operation of the aircraft 200 for aerodynamic purposes. Alternatively, the sealing ring 218 may be moved to the deployed (i.e., extended) position at any time during operation of the propellers 206 to permit the exit or entrance of air, as depicted by the arrows in FIG. 7. A motor or solenoid is configured to move the sealing ring 218 between those positions.

What is claimed is:

1. An aircraft comprising:
   an energy battery,
   a power battery,
   lifting rotors,
   cruise propellers,
   a reserve power battery that is configured to selectively supply power to the lifting rotors in an emergency and not during regular take-off and landing phases of the aircraft, and
   a DC voltage converter, wherein the reserve power battery and the power battery are connected to one side of the DC voltage converter, and the energy battery is connected to another side of the DC voltage converter,
   wherein the energy battery is configured to supply power to the cruise propellers in cruising phases of the aircraft, and the power battery is configured to supply power to the lifting rotors in the regular take-off and landing phases of the aircraft, and
   wherein the reserve power battery is rechargeable, and, during the cruising phases, the energy battery is configured to charge the power battery and the reserve power battery.

2. The aircraft as claimed in claim 1, wherein the aircraft has a fully electric drive.

3. The aircraft as claimed in claim 1, wherein the aircraft comprises bent or bendable wings.

4. The aircraft as claimed in claim 1, wherein the batteries are chargeable in a predetermined time.

5. The aircraft as claimed in claim 1, wherein the lifting rotors are horizontally fixed ducted fans.

6. The aircraft as claimed in claim 5, wherein the aircraft has louvers and the horizontal ducted fans are selectively able to be covered by way of the louvers.

7. The aircraft as claimed in claim 1, wherein the cruise propellers are vertically fixed ducted fans for generating a propulsion.

8. The aircraft as claimed in claim 1, wherein the aircraft is able to be selectively controlled in a fully autonomous manner.

9. The aircraft as claimed in claim 1, wherein the reserve power battery is not configured to supply power to the lifting rotors during the cruising phases.

10. The aircraft as claimed in claim 1, wherein the reserve power battery is not configured to supply power to the cruise propellers during either the cruising phases or the emergency.

* * * * *